US005707726A

United States Patent [19]

Ohtaka et al.

[11] Patent Number: 5,707,726

[45] Date of Patent: Jan. 13, 1998

[54] ALUMINUM PIPE PRODUCTION PROCESS, ELECTROPHOTOGRAPHIC PHOTOSENSITIVE MEMBER PRODUCED BY THE PRODUCTION PROCESS, AND ELECTROPHOTOGRAPHIC APPARATUS HAVING THE ELECTROPHOTOGRAPHIC PHOTOSENSITIVE MEMBER

[75] Inventors: Mutsuo Ohtaka, Ryugasaki; Hisami Tanaka, Yokohama; Shinichi Shibayama, Toride; Yosuke Okubo, Ushiku; Tatsu Nakajima, Tsukuba, all of Japan

[73] Assignee: Canon Kabushiki Kaisha, Tokyo, Japan

[21] Appl. No.: 662,082

[22] Filed: Jun. 12, 1996

Related U.S. Application Data

[62] Division of Ser. No. 389,626, Feb. 15, 1995, Pat. No. 5,595,848, which is a division of Ser. No. 9,734, Jan. 27, 1993, abandoned.

[30] Foreign Application Priority Data

| | | | |
|---|---|---|---|
| Jan. 31, 1992 | [JP] | Japan | 4-41954 |
| Jan. 22, 1993 | [JP] | Japan | 5-25986 |

[51] Int. Cl.[6] .............................. B32B 5/16; G03G 15/04

[52] U.S. Cl. .............................. 428/328; 430/69; 492/15; 399/279; 399/286

[58] Field of Search .............................. 428/328; 430/69; 492/15; 399/279, 286

[56] References Cited

U.S. PATENT DOCUMENTS

| | | | |
|---|---|---|---|
| 1,914,587 | 6/1933 | Wise | 72/40 |
| 3,055,102 | 9/1962 | Shaw et al. | 72/275 |
| 3,093,897 | 6/1963 | Lemyre et al. | 72/275 |
| 3,889,427 | 6/1975 | McCoy | 51/80 A |
| 4,987,046 | 1/1991 | Kutami et al. | 430/127 |
| 5,237,746 | 8/1993 | Aoki et al. | 72/272 |
| 5,238,467 | 8/1993 | Hashiba et al. | 51/293 |
| 5,452,971 | 9/1995 | Nevills | 408/230 |

FOREIGN PATENT DOCUMENTS

| | | | |
|---|---|---|---|
| 3434227 | 3/1986 | Germany | B24B 39/04 |
| 3908295 | 9/1989 | Germany | G03G 5/10 |
| 1-7322 | 1/1989 | Japan | 72/341 |
| 3-149180 | 6/1991 | Japan . | |

OTHER PUBLICATIONS

Patent Abstracts of Japan, vol. 7, No. 235 (C–191), Oct. 19, 1993 (JPA–58–126928).

Patent Abstracts of Japan, vol. 15, No. 374 (M–1160), Sep. 20, 1991 (JPA–3–149180).

Patent Abstracts of Japan, vol. 12, No. 471 (M–773), Dec. 9, 1988 (JPA–63–194839).

*Primary Examiner*—Mark Chapman
*Attorney, Agent, or Firm*—Fitzpatrick, Cella, Harper & Scinto

[57] ABSTRACT

A process for producing an aluminum pipe is disclosed which has the steps of cutting the aluminum pipe on its periphery, and thereafter carrying out rotary pressure rolling. Also, an electrophotographic photosensitive member, a device unit, an electrophotographic apparatus and a developing roll having the aluminum pipe are disclosed.

6 Claims, 3 Drawing Sheets

ALUMINUM PIPE PRODUCTION PROCESS, ELECTROPHOTOGRAPHIC PHOTOSENSITIVE MEMBER PRODUCED BY THE PRODUCTION PROCESS, AND ELECTROPHOTOGRAPHIC APPARATUS HAVING THE ELECTROPHOTOGRAPHIC PHOTOSENSITIVE MEMBER

This application is a division of application Ser. No. 08/389,626 filed Feb. 15, 1995, now U.S. Pat. No. 5,595,848, which is a division of application Ser. No. 08/009,734, filed Jan. 27, 1993, now abandoned.

BACKGROUND OF THE INVENTION

1. Field of the Invention

The present invention relates to a process for producing an aluminum pipe, and more particularly to a process for producing an aluminum pipe used for a support or substrate of an electrophotographic photosensitive member, which can also be applied to a developing roll of a copying machine, a developer fixing roll and so forth. In particular, it is an aluminum pipe capable of showing a superior performance when used as a substrate for an electrophotographic photosensitive member.

2. Related Background Art

Substrates for electrophotographic photosensitive members have been hitherto produced by a process comprising the steps of working an aluminum pipe or aluminum alloy pipe in a given dimension by hot extrusion or drawing, and thereafter;

A. finishing the pipe to have a surface roughness of 2 μm or less by precision cutting; or B. finishing the pipe to have a surface roughness of 2 μm or less by rotary pressure rolling (Japanese Patent Application Laid-open No. 3-149180).

Electrophotographic photosensitive members in which an aluminum pipe worked by the precision cutting of the step A is used as a substrate and a photosensitive layer is provided thereon are widely used because of their excellent potential stability. However, the production of aluminum pipes by the precision cutting process requires a long time for their working which does not permit mass-production, resulting in a high cost. Hence, the advent of a substitute process has been sought.

The rotary pressure rolling of the step B is a method by which surface irregularities of the aluminum pipe extruded or drawn are smoothed using rotary pressure rolls. This is a method that can achieve the same excellent surface roughness as that in the precision cutting of the step A. However, the electrophotographic photosensitive member comprising a rotary-pressure-rolled aluminum pipe used as a substrate and a photosensitive layer provided thereon has many problems in its performance and has been unsuitable for its practical use.

In an attempt to produce as an experiment an electrophotographic photosensitive member comprising the rotary-pressure-rolled aluminum pipe used as a substrate and a photosensitive layer provided thereon, a photosensitive layer with a uniform layer thickness has been formed, but nevertheless it has caused so large an unevenness between charge potential and post-exposure potential and also so large a density unevenness in images reproduced that it has been unsuitable for practical use.

SUMMARY OF THE INVENTION

An object of the present invention is to solve at a stroke many problems that have been hitherto unsolved, i.e., to provide an aluminum pipe production process that can carry out surface finishing at a high precision and also is suitable for mass-production, and to provide an aluminum pipe production process that makes it possible to produce a high-quality electrophotographic photosensitive member, which has been unachievable in the conventional rotary pressure rolling (e.g. roller vanishing).

Another object of the present invention is to provide an electrophotographic apparatus having a high-quality electrophotographic photosensitive member.

In the present invention, an aluminum pipe is cut on its periphery to give an external dimension and surface roughness controlled within a given range, and then worked by rotary pressure rolling to finish its surface to have a smaller surface roughness.

The aluminum pipe produced by the process of the present invention is particularly suitable as a substrate for an electrophotographic photosensitive member. The reason therefor is presumed as follows: Before the aluminum pipe is worked, an aluminum oxide film is formed on its surface by natural oxidation in a non-uniform layer thickness. If the rotary pressure rolling is directly applied thereto, the layer thickness of this oxide film becomes more non-uniform to adversely affect electrophotographic performance. Now, the aluminum pipe is cut on its periphery before the rotary pressure rolling to remove the oxide film, whereby this problem can be solved.

DETAILED DESCRIPTION OF THE PREFERRED EMBODIMENTS

As employed herein the phrase "aluminum pipe" refers to a solid or hollow aluminum pipe.

The aluminum pipe is formed by, e.g., hot extrusion, cold drawing or hot drawing of an aluminum material. Next, its length is adjusted in a given size by cutting.

Then, in order to remove the oxide film naturally formed on the periphery of the aluminum pipe, the aluminum pipe is cut on its periphery. In the cutting, for example, the aluminum pipe is rotated on a lathe and cut with a diamond cutting tool. The diamond cutting tool may preferably be an R cutting tool. The cutting may preferably be carried out under conditions of a lathe revolution number of from 1,000 to 50,000 rpm and a feed rate of from 0.01 to 0.5 mm/revolution. Since cuttings are produced during the cutting, it is preferable to blow air so that the cuttings are forcibly blown off toward the uncut portions. Since the cutting is carried out to remove also the oxide film, it may preferably be done in a depth of from about 0.01 to 1 mm.

Figure 3:
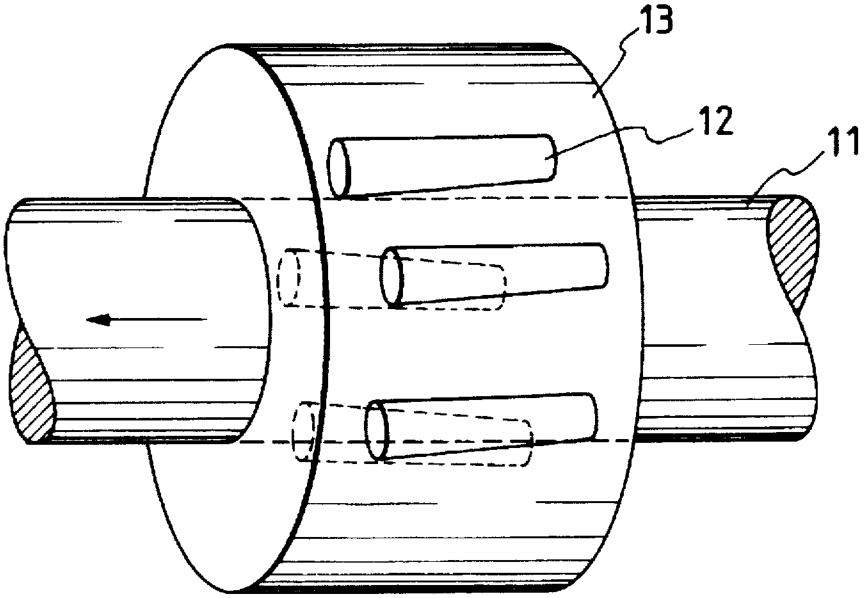
FIG. 3 is a schematic perspective view of a rotary pressure rolling apparatus used in the present invention.
Figure 4:
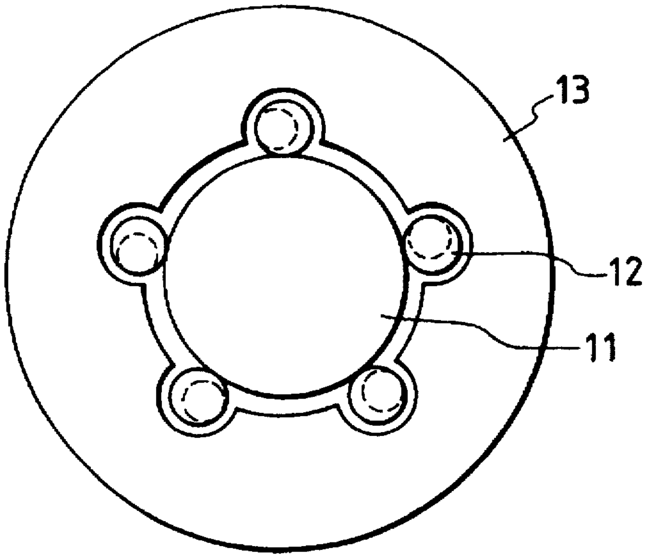
FIG. 4 is a schematic cross section of the rotary pressure rolling apparatus used in the present invention.

After the cutting, the aluminum pipe is further subjected to rotary pressure rolling on its periphery. A number of, three or more, preferably 5 to 13, rotary pressure rolls are pressed from the outside against the periphery of the aluminum pipe so that irregularities on its periphery are pressed down to finish the surface smoothly. At this time, only convexities are pressed down and irregularities may remain. The surfaces of the rotary pressure rolls must be smooth in a high precision, and high speed steel and super steel are used as materials for the rotary pressure rolls. The rotary pressure rolls have cylindrical shapes, and may preferably have a diameter made gradually larger toward the outlet. The rotary pressure rolls may preferably have a length of from 2 mm to 50 mm. As shown in FIG. 4, the rotary pressure rolls 12 are circumferentially disposed. As also shown in FIG. 3, the rotary pressure rolls 12 are obliquely disposed at an angle of from 0.5° to 45°, preferable 1° to 10°, with respect to the axial direction of the aluminum pipe 11. Thus, as the rotary pressure rolls are rotated together with a rotary pressure roll holder 13, the aluminum pipe 11 is moved with this rotation, so that the rotary pressure rolling can be carried out. Taking such steps, an aluminum pipe that can be used as an electrophotographic photosensitive member can be provided. It is possible to obtain aluminum pipes having the desired roundness and surface smoothness.

It is also possible to regenerate substrates of used electrophotographic photosensitive members by treating them according to the production process of the present invention.

In another embodiment of the present invention, it is effective to work Out the surface through the two-stage steps of carrying out centerless grinding to cut the aluminum pipe on its periphery, formed from an aluminum material, and subsequently carrying out rotary pressure rolling.

In this embodiment also, the aluminum pipe is formed by, e.g., hot extrusion, cold drawing or hot drawing of an aluminum material. Next, its length is adjusted in a given size by cutting. Then, in order to remove the oxide film naturally formed on the periphery of the aluminum pipe, the centerless grinding is carried out.

Figure 1:
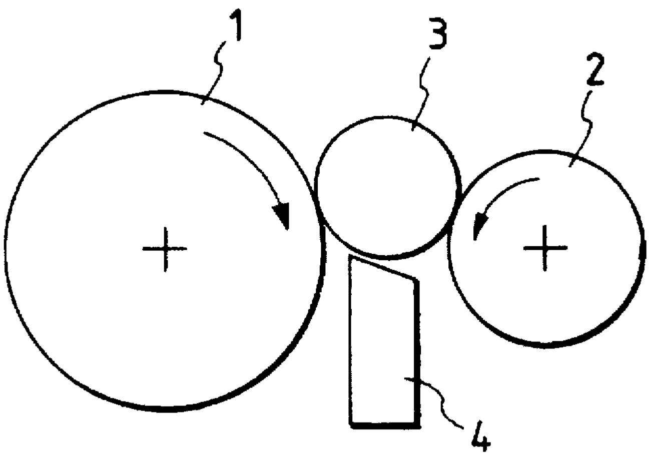
FIG. 1 illustrates a principle of centerless grinding used in the present invention.
Figure 2:
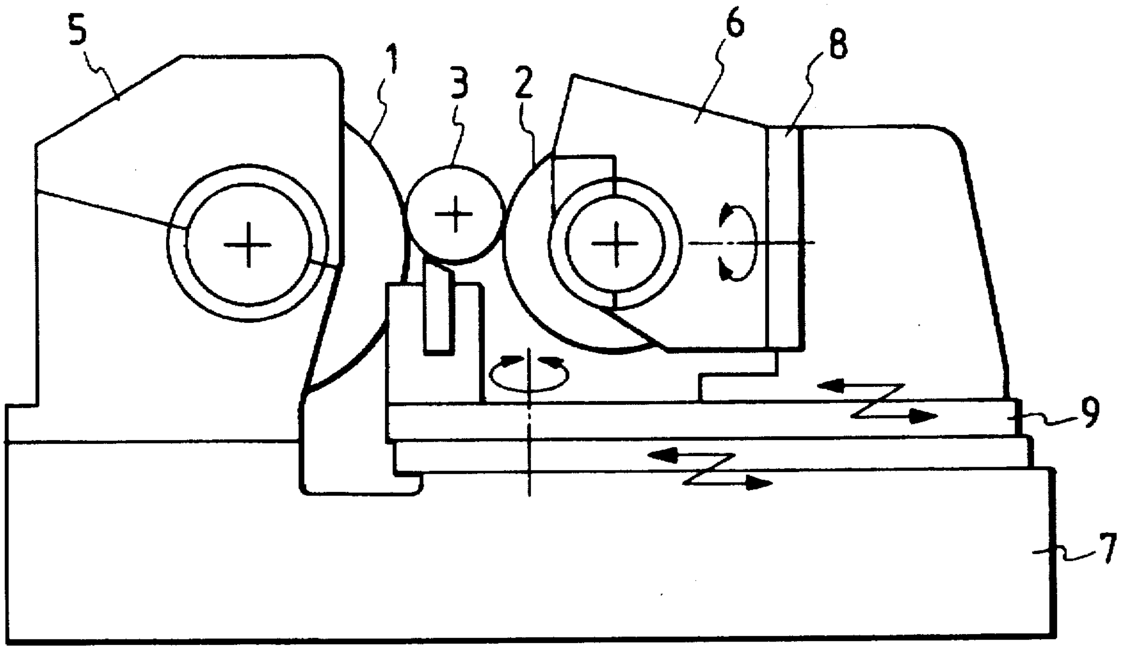
FIG. 2 is a schematic cross section of a centerless grinding apparatus used in the present invention.

FIG. 1 illustrates a principle of the centerless grinding. A grinding wheel 1 and an adjusting wheel 2 are rotated at different linear speeds, and hence an aluminum pipe 3 is ground. Reference numeral 4 denotes a blade. FIG. 2 illustrates a centerless grinding apparatus. It is so constructed that a grinding wheel holder 5 is set stationary to a bed 7 and an adjusting wheel holder 6 is set movable. The adjusting wheel holder 6 is fitted to a vertical swivel slide 8 on a horizontal swiveling table 9 in the manner that the feed angle can be adjusted. The vertical swivel slide is so made that its movement can be adjusted according to the diameter of the aluminum pipe being worked. The horizontal swiveling table is used to make adjustment of taper or contact. The grinding wheel may preferably have an outer diameter of from 300 mm to 1,000 mm, and may preferably be rotated at a peripheral speed of from 100 m/min to 5,000 m/min. The adjusting wheel may preferably have an outer diameter of from 20 mm to 500 mm, and is rotated at a peripheral speed set lower than that of the grinding wheel. The grinding wheel and adjusting wheel used have a length larger than the length of the aluminum pipe. The grinding wheel and adjusting wheel may preferably have an abrasive particle mesh of from #10 to #1,500, more preferably #40 to #1,000.

After the centerless grinding, the aluminum pipe is further subjected to rotary pressure rolling on its periphery. The rotary pressure rolling is carried out in entirely the same manner as the rotary pressure rolling carried out after the cutting previously described. Since the centerless grinding may give insufficient roundness, the rotary pressure rolling is particularly effective to improve the roundness.

When the aluminum pipe produced according to the present invention is used as a conductive substrate and a photosensitive layer is provided thereon, an electrophotographic photosensitive member cab be prepared. The electrophotographic photosensitive member is constructed as described below.

A subbing layer having a barrier function and an adhesive function may be provided between the conductive substrate and a photosensitive layer. The subbing layer can be formed of casein, polyvinyl alcohol, nitrocellulose, an ethylene-acrylic acid copolymer, polyamide, polyurethane, gelatin, aluminum oxide or the like. It is suitable for the subbing layer to have a layer thickness of 5 μm or less, and preferably from 0.5 to 3 μm. In order for the subbing layer to exhibit its function, it should have a resistivity of at least $10^7$ Ω•cm.

The photosensitive layer is formed, for example, by coating a photoconductive material such as an organic photoconductive material, amorphous silicon or selenium made into a coating composition optionally together with a binder, or by vacuum deposition of such a material. In the case when the organic photoconductive material is used, a photosensitive layer comprised of a combination of a charge generation layer that generates charge carriers upon exposure and a charge transport layer that is capable of transporting the charge carriers generated can also be effectively used.

The charge generation layer can be formed by vacuum deposition of one or more of charge-generating materials such as an azo pigment, a quinone pigment, a quinocyanine pigment, a perylene pigment, an indigo pigment, a bisbenzoimidazole pigment, a phthalocyanine pigment and a quinacridone pigment, or by coating of a composition prepared by dispersing any of them together with a suitable binder (the binder may be omitted).

The binder can be selected from a vast range of insulating resins or organic photoconductive polymers. For example, the insulating resins include polyvinyl butyral, polyallylates (condensation polymers of bisphenol-A and phthalic acid), polycarbonates, polyesters, phenoxy resins, acrylic resins, polyacrylamide resins, polyamides, cellulose resins, urethane resins, epoxy resins, casein and polyvinyl alcohols. The organic photoconductive polymers include carbazole, polyvinyl anthracene and polyvinyl pyrene.

The charge generation layer may have a layer thickness of from 0.01 to 15 μm, and preferably from 0.05 to 5 μm. The charge generation layer and the binder may be in a weight ratio of from 10:1 to 1:20.

The solvent used for the charge generation layer coating composition is selected taking account of the solubility or dispersion stability of the resins and charge-transporting material used. As an organic solvent, it is possible to use alcohols, sulfoxides, ethers, esters, aliphatic halogenated hydrocarbons or aromatic compounds.

The coating may be carried out by coating methods such as dip coating, spray coating, Mayer bar coating and blade coating.

The charge transport layer is formed by coating a solution prepared by dissolving a charge-transporting material in a film-forming resin. An organic charge-transporting material that may be used in the present invention can be exemplified by hydrazone compounds, stilbene compounds, pyrazoline compounds, oxazole compounds, thiazole compounds and triarylmethane compounds. Any of these charge-transporting materials may be used alone or in combination of two or more kinds.

A binder that may be used in the charge transport layer can be exemplified by phenoxy resins, polyacrylamide, polyvinyl butyral, polyallylate, polysulfone, polyamide, acrylic resins, acrylonitrile resins, methacrylic resins, vinyl chloride resins, vinyl acetate resins, phenol resins, epoxy resins, polyesters, alkyd resins, polycarbonates such as polycarbonate-A, polycarbonate-Z and modified polycarbonates, polyurethanes, or copolymers containing two or more repeating units of any of these resins, as exemplified by a styrene-butadiene copolymer, a styrene-acrylonitrile copolymer and a styrene-maleic acid copolymer. The binder may also be selected from organic photoconductive polymers such as poly-N-vinyl carbazole, polyvinyl anthracene and polyvinyl pyrene.

The charge transport layer may have a layer thickness of from 5 to 50 μm, and preferably from 8 to 20 μm. The charge transport material and the binder may be in a weight ratio of from 5:1 to 1:5, and preferably from 3:1 to 1:3, in approximation. The coating can be carried out by the methods previously described.

A protective layer may also be optionally provided since dyes, pigments, organic charge-transporting materials and so forth are commonly not resistant to ultraviolet rays, ozone, stains due to oil or the like, and metals. In order to form electrostatic latent images on this protective layer, it should preferably have a surface resistivity of not lower than $10^{11}$ Ω.

The protective layer that can be used in the present invention can be formed by coating on the photosensitive layer a solution prepared by dissolving in a suitable organic solvent a resin such as polyvinyl butyral, polyester, polycarbonate, acrylic resin, methacrylic resin, nylon, polyimide, polyallylate, polyurethane, styrene-butadiene copolymer, styrene-acrylic acid copolymer or styrene-acrylonitrile copolymer, followed by drying. The protective layer may usually have a layer thickness of from 0.05 to 20 μm. This protective layer may also be incorporated With an ultraviolet absorbent.

Figure 5:
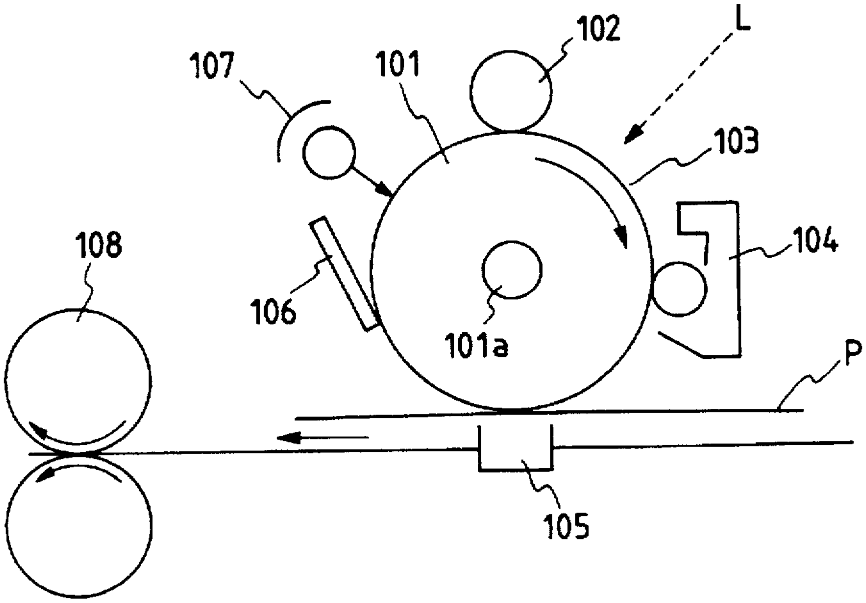
FIG. 5 is a schematic illustration of the construction of a commonly available transfer type electrophotographic apparatus making use of the electrophotographic photosensitive member according to the present invention.

FIG. 5 schematically illustrates the structure of a transfer electrophotographic apparatus in which a drum type photosensitive member produced in this way is used.

In FIG. 5, reference numeral 101 denotes a drum type photosensitive member serving as an image bearing member, which is rotated around a shaft **101*a* at a given peripheral speed in the direction shown by an arrow. In the course of rotation, the photosensitive member 101 is uniformly charged on its periphery, with positive or negative given potential by the operation of a charging means 102, and then photoimagewise exposed to light L (slit exposure, laser beam scanning exposure, etc.) at an exposure zone 103** by the operation of an imagewise exposure means (not shown). As a result, electrostatic latent images corresponding to the exposure images are successively formed on the periphery of the photosensitive member.

The electrostatic latent images thus formed are subsequently developed by toner by the operation of a developing means 104. The resulting toner-developed images are then successively transferred by the operation of a transfer means 105, to the surface of a transfer medium P fed from a paper feed section (not shown) to the part between the photosensitive member 101 and the transfer means 105 in the manner synchronized with the rotation of the photosensitive member 101.

The transfer medium P on which an image has been transferred is separated from the surface of the photosensitive member and led through an image-fixing means 108, where the image is fixed and then delivered to the outside as a transcript (a copy).

The surface of the photosensitive member 101 after the transfer of the image is brought to removal of the toner remaining after the transfer, using a cleaning means 106. Thus the photosensitive member is cleaned on its surface, further subjected to charge elimination by a pre-exposure means 107, and then repeatedly used for the formation of images.

The charging means 102 for giving uniform charge on the photosensitive member 101 include corona charge assemblies, which are commonly put into wide use. As the transfer means 105, corona transfer assemblies are also commonly put into wide use.

The electrophotographic apparatus may be constituted of a combination of plural components joined as one device unit from among the constituents such as the above photosensitive member, developing means and cleaning means so that the unit can be freely mounted on or detached from the body of the apparatus. For example, the photosensitive member and at least one of the charging means, developing means and cleaning means may be joined into one device unit so that the unit can be freely mounted or detached using a guide means such as rails provided in the body of the apparatus. Here, the above device unit may be so constructed as to be joined together with the charging means and/or the developing means.

In the case when the electrophotographic apparatus is used as a copying machine or a printer, the photosensitive member is exposed to optical image exposing light L by irradiation with light reflected from, or transmitted through, an original, or by the scanning of a laser beam, the driving of an LED array or the driving of a liquid crystal shutter array according to signals obtained by reading an original with a sensor and converting the information into signals.

Figure 6:
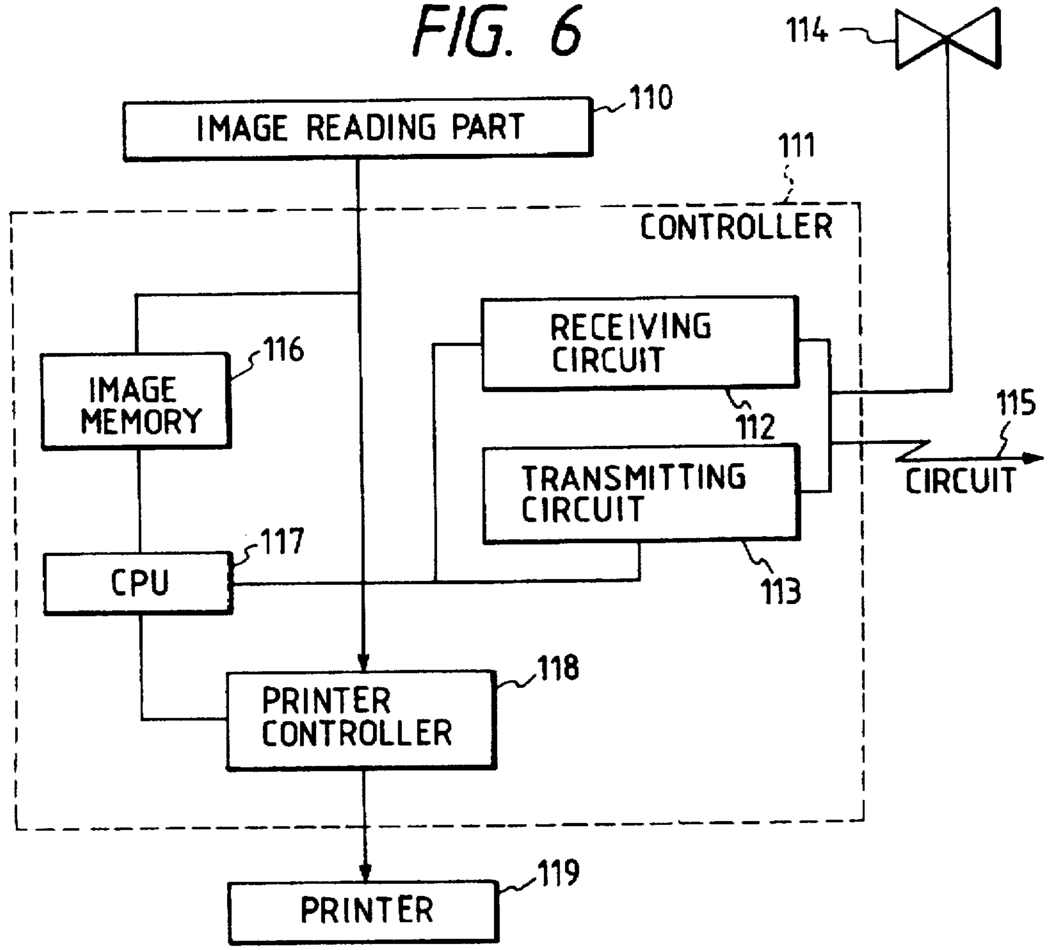
FIG. 6 is a block diagram of a facsimile system in which the electrophotographic apparatus according to the present invention is used as a printer.

When used as a printer of a facsimile machine, the optical image exposing light L serves as exposing light used for the printing of received data. FIG. 6 illustrates an example thereof in the form of a block diagram.

As shown in FIG. 6, a controller 111 controls an image reading part 110 and a printer 119. The whole of the controller 111 is controlled by CPU 117. Image data outputted from the image reading part is sent to the other facsimile station through a transmitting circuit 113. Data received from the other station is sent to a printer 119 through a receiving circuit 112. Given image data are stored in an image memory 116. A printer controller 118 controls the printer 119. The numeral 114 denotes a telephone.

An image received from a circuit 115 (image information from a remote terminal connected through the circuit) is demodulated in the receiving circuit 112, and then successively stored in an image memory 116 after the image information is decoded by the CPU 117. Then, when images for at least one page have been stored in the memory 116, the image recording for that page is carried out. The CPU 117 reads out the image information for one page from the memory 116 and sends the coded image information for one page to the printer controller 118. The printer controller 118, having received the image information for one page from the CPU 117, controls the printer 119 so that the image information for one page is recorded.

The CPU 117 receives image information for next page in the course of the recording by the printer 119.

Images are received and recorded in this way.

An aluminum pipe produced by the method according to the present invention can be also utilized for a fixing roll and a developing roll which are used for an image fixing means 108 or a developing means 104.

In the case when the aluminum pipe is used as a developing roll, the aluminum pipe produced by the method according to the present invention may by used as a conductive substrate, and a conductive resin layer may be provided thereon. A preferred developing roll is thus produced.

A conductive resin layer which is formed on an outer peripheral surface of a developing roll is described below.

The conductive resin layer is formed on the surface of the developing roll as a developer carrying member, and comprises a resin layer containing a conductive fine particle with an average particle diameter of about 20 μm such as carbon powder. The resin layer containing the conductive fine particle, i.e., conductive resin layer, has an average volume resistivity of $10^{-3}$ to $10^{3}$ Ω•cm, and thickness of 1.0 μm to 20 μm. The resin layer is a conductive fine particle layer in which the conductive fine particle appears on a surface layer and size of a second particle of the conductive fine particle and resin is not more than 1.0 μm.

A content of the above conductive fine particle which is incorporated in the conductive resin layer in order to impart a conductivity to the resin layer is 30 to 70% by weight. At that time, 30 to 100% by weight of carbon graphite may be incorporated in the conductive fine particle such as carbon powder as mentioned above.

In order to form such a conductive resin layer on an outer surface of a substrate for a developing roll, a conductive paste is applied to cover the outer surface of the substrate by spraying or dipping. Thus, a developing roll having a conductive resin layer on the surface is obtained.

The present invention will be described below by giving Examples. In the following, "part(s)" refers to "part(s) by weight".

EXAMPLE 1

An aluminum pipe with an outer diameter of 30.2 mm was produced by hot extrusion, and was cut in a length of 260.5 mm. Next, the pipe was cut on its periphery by means of a lathe using a 4R cutting tool at a rotational speed of 10,000 rpm and a feed rate of 0.05 mm/revolution. In order to remove cuttings, air was blown so that the cuttings were forcibly blown off toward the uncut portions. The aluminum pipe having been thus cut had a roundness of 25 μm, a surface roughness of Rmax 1.5 μm and Ra 0.2 μm and an outer diameter of 29.9 mm.

The aluminum pipe was further subjected to rotary pressure rolling using the apparatus as shown in FIG. 3 to give an aluminum pipe having a roundness of 20 μm, s surface roughness Rmax 0.4 μm and Rs 0.2 μm, an outer diameter of 29.9 mm and a length of 260.5 mm. This aluminum pipe was washed with trichloroethane to give a conductive substrate. The rotary pressure rolls used in this Example had the structure as shown in FIGS. 3 and 4, where five rotary pressure rolls 12 were disposed, each having a roll length of 30 mm, a maximum diameter of 7 mm and minimum diameter of 5 mm.

Next, 4 parts of a copolymer nylon (trade name: CM8000; available from Toray Industries, Inc.) and 4 parts of type-8 nylon (trade name: Luckamide 5003; available from Dainippon Ink & Chemicals, Incorporated) were dissolved in a mixture of 50 parts of methanol and 50 parts of n-butanol to give a coating composition. This coating composition was applied onto the above conductive substrate by dip coating to form a polyamide subbing layer with a thickness of 0.6 μm.

Subsequently, in a sand mill, 10 parts of disazo pigment represented by the formula:

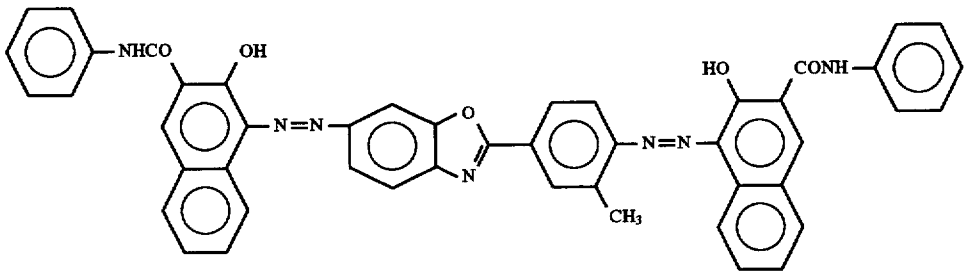

and 10 parts of polyvinyl butyral resin (S-LEC BM2; available from Sekisui Chemical Co., Ltd.) were dispersed together with 120 parts of cyclohexanone for 10 hours. To the resulting dispersion, 30 parts of methyl ethyl ketone was added, which was then coated on the above subbing layer to form a charge generation layer with a thickness of 0.15 μm.

Next, 10 parts of polycarbonate-Z resin (available from Mitsubishi Gas Chemical Company, Inc.) with a weight average molecular weight of 120,000 was made ready for use, and was dissolved in 80 parts of monochlorobenzene together with 10 parts of a hydrazone compound represented by the formula:

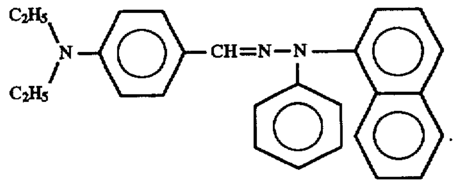

The resulting solution was coated on the above charge generation layer to form a charge transport layer with a thickness of 16 μm. An organic photosensitive member No. 1 was thus produced.

Comparative Example 1

An aluminum pipe on which only the cutting was carried out in the same manner as in Example 1 and no rotary pressure rolling was carried out was prepared. After washing, a photosensitive layer was formed in the same manner as in Example 1 to give an organic photosensitive member No. 2.

Comparative Example 2

An aluminum pipe on which the cutting carried out in Example 1 was not carried out and only rotary pressure rolling was carried out was prepared. The aluminum pipe having been thus rotary-pressure-rolled had a roundness of 50 μm and a surface roughness of Rmax 0.6 μm and Ra 0.2 μm. After washing, a photosensitive layer was formed in the same manner as in Example 1 to give an organic photosensitive member No. 3.

Evaluation

The photosensitive members Nos. 1 to 3, produced in Example 1 and Comparative Examples 2 and 3, were each set on a regular development type copying machine (trade name: FC-3; manufactured by Canon Inc.) to evaluate the images.

The photosensitive member No. 1 caused no faults such as black dots and white dots, and uniform images were obtained even in half-tone images. The photosensitive member No. 2 caused many faults such as black dots and white dots, and the photosensitive member was found unsuitable for practical use. The photosensitive member No. 3 caused unevenness in half-tone images, where island-like spots were seen, and the photosensitive member was found unsuitable for practical use.

EXAMPLE 2

An aluminum pipe with an outer diameter of 30.2 mm was produced by cold drawing, and was cut in a length of 260.5 mm. Next, the pipe was cut on its periphery by means of a lathe using a 4R cutting tool at a rotational speed of 7,000 rpm end a feed rate of 0.05 mm/revolution. In order to remove cuttings, air was blown so that the cuttings were forcibly blown off toward the uncut portions. The aluminum pipe having been thus cut had a roundness of 10 μm, a surface roughness of Rmax 1.4 μm and Ra 0.2 μm and an outer diameter of 29.9 mm.

The aluminum pipe was further subjected to rotary pressure rolling using the apparatus as shown in FIG. 3 to give an aluminum pipe having a roundness of 18 μm, a surface roughness Rmax 0.4 μm and Rs 0.2 μm, an outer diameter of 29.9 mm and a length of 260.5 mm. This aluminum pipe was washed with trichloroethane to give a conductive substrate.

Next, 4 parts of a copolymer nylon (trade name: CM8000; available from Toray Industries, Inc.) and 4 parts of type-8 nylon (trade name: Luckamide 5003; available from Dainippon Ink & Chemicals, Incorporated) were dissolved in s mixture of 50 parts of methanol and 50 parts of n-butanol to give a coating composition. This coating composition was applied onto the above conductive substrate by dip coating to form a polyamide subbing layer with a thickness of 0.6 μm.

Subsequently, in a sand mill, 10 parts of disazo pigment represented by the formula:

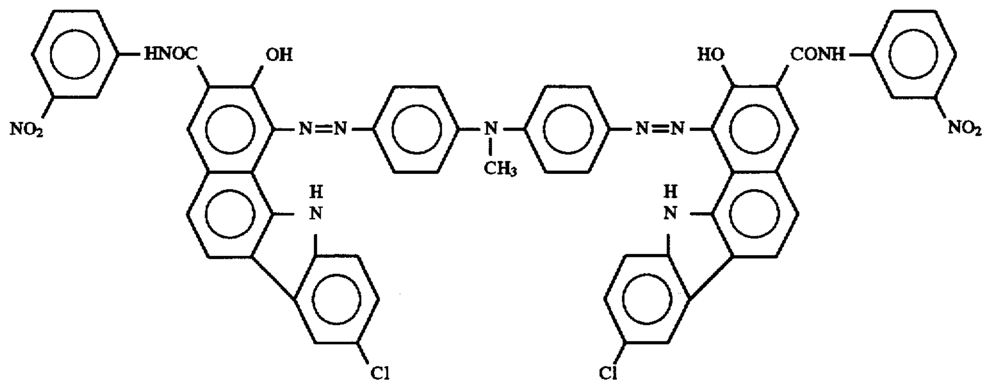

and 10 parts of polymethyl methacrylate resin (trade name: DIANAL BR-50; available from Mitsubishi Rayon Co., Ltd.) Here dispersed together with 120 parts of cyclohexanone for 10 hours. To the resulting dispersion, 30 parts of methyl ethyl ketone was added, which has then coated on the above subbing layer to form a charge generation layer with a thickness of 0.15 μm.

Next, 10 parts of polycarbonate-Z resin (available from Mitsubishi Gas Chemical Company, Inc.) with a weight average molecular weight of 120,000 was made ready for use, and was dissolved in 80 parts of monochlorobenzene together with 10 parts of a hydrazone compound represented by the formula:

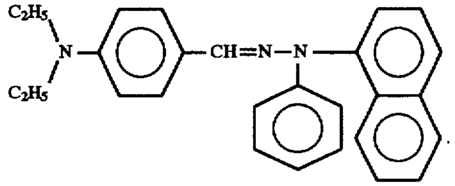

The resulting solution was coated on the above charge generation layer to form a charge transport layer with a thickness of 20 μm. An organic photosensitive member No. 4 was thus produced.

Comparative Example 3

An aluminum pipe on which only the cutting was carried out in the same manner as in Example 2 and no rotary pressure rolling was carried out was prepared. After washing, a photosensitive layer was formed in the same manner as in Example 2 to give an organic photosensitive member No. 5.

Comparative Example 4

An aluminum pipe on which the cutting carried out in Example 2 was not carried out and only rotary pressure rolling was carried out was prepared. The aluminum pipe having been thus rotary-pressure-rolled had a roundness of 25 μm and a surface roughness of Rmax 0.6 μm and Ra 0.2 μm. After washing, a photosensitive layer was formed in the same manner as in Example 2 to give an organic photosensitive member No. 6.

Evaluation

The photosensitive members Nos. 4 to 6, produced in Example 2 and Comparative Examples 3 and 4, were each set on a reversal development type laser beam printer (trade name: LBP-SX; manufactured by Canon Inc.) to evaluate the images.

The photosensitive member No. 4 caused no faults such as black dots and white dots, and uniform images were obtained even in half-tone images. The photosensitive member No. 5 caused many faults such as black dots and white dots, and the photosensitive member was found unsuitable for practical use. The photosensitive member No. 6 caused unevenness in half-tone images, where island-like spots were seen, and the photosensitive member was found unsuitable for practical use.

EXAMPLE 3

An aluminum pipe with an outer diameter of 30.2 mm was produced by hot extrusion, and was cut in a length of 260.5 mm.

Next, the pipe was externally ground by centerless grinding. The centerless grinding apparatus used in this Example had the construction as shown in FIGS. 1 and 2. The grinding wheel had an outer diameter of 610 mm and a length of 405 mm and was rotated at a peripheral speed of 1,800 m/min. The adjusting wheel had an outer diameter of 330 mm and a length of 405 mm and was rotated at a peripheral speed of 500 m/min. The abrasive stone was in a mesh of #1,000.

The aluminum pipe having been subjected to the centerless grinding had a roundness of 40 μm, a surface roughness of Rmax 1.8 μm and Ra 0.4 μm and an outer diameter of 29.9 mm.

The aluminum pipe was further subjected to rotary pressure rolling using the apparatus as shown in FIG. 3 to give an aluminum pipe having a roundness of 22 μm, a surface roughness Rmax 0.8 μm and Ra 0.2 μm, an outer diameter of 29.9 mm and a length of 260.5 mm. This aluminum pipe was washed with trichloroethane to give a conductive substrate. Thereafter, a photosensitive layer was formed in the same manner as in Example 1. An organic photosensitive member No. 7 was thus produced.

Comparative Example 5

An aluminum pipe on which only the centerless grinding was carried out in the same manner as in Example 3 and no rotary pressure rolling was carried out was prepared. After washing, a photosensitive layer was formed in the same manner as in Example 3 to give an organic photosensitive member No. 8.

Comparative Example 6

An aluminum pipe on which the centerless grinding carried out in Example 3 was not carried out and only rotary pressure rolling was carried out was prepared. The aluminum pipe having been thus rotary-pressure-rolled had a roundness of 50 μm and a surface roughness of Rmax 0.6 μm and Ra 0.2 μm. After washing, a photosensitive layer was formed in the same manner as in Example 3 to give an organic photosensitive member No. 9.

Evaluation

The photosensitive members Nos. 7 to 9, produced in Example 3 and Comparative Examples 5 and 6, were each set on a regular development type copying machine (trade name: FC-3; manufactured by Canon Inc.) to evaluate the images.

The photosensitive member No. 7 caused no faults such as black dots and white dots, end uniform images were obtained even in half-tone images. The photosensitive member No. 8 caused many faults such as black dots and white dots and also caused unevenness in half-tone images, and the photosensitive member was found unsuitable for practical use. The photosensitive member No. 9 caused unevenness in half-tone images, where island-like spots were seen, and the photosensitive member was found unsuitable for practical use.

EXAMPLE 4

An aluminum pipe with an outer diameter of 30.2 mm was produced by cold drawing, and was cut in a length of 260.5 mm.

Next, the pipe was externally ground by centerless grinding. The aluminum pipe having been subjected to the centerless grinding had a roundness of 35 μm, a surface roughness of Rmax 1.6 μm and Ra 0.2 μm and an outer diameter of 29.9 mm.

The aluminum pipe was further subjected to rotary pressure rolling using the apparatus as shown in FIG. 3 to give an aluminum pipe having a roundness of 20 μm, a surface roughness Rmax 0.4 μm and Ra 0.2 μm, an outer diameter of 29.9 mm and a length of 260.5 mm. This aluminum pipe was washed with trichloroethane to give a conductive substrate. Thereafter, a photosensitive layer was formed in the same manner as in Example 2. An organic photosensitive member No. 10 was thus produced.

Comparative Example 7

An aluminum pipe on which only the centerless grinding was carried out in the same manner as in Example 4 and no rotary pressure rolling was carried out was prepared. After washing, a photosensitive layer was formed in the same manner as in Example 4 to give an organic photosensitive member No. 11.

Comparative Example 8

An aluminum pipe on which the centerless grinding carried out in Example 4 was not carried out and only rotary pressure rolling was carried out was prepared. The aluminum pipe having been thus rotary-pressure-rolled had a roundness of 50 μm and a surface roughness of Rmax 0.6 μm and Ra 0.2 μm. After washing, a photosensitive layer was formed in the same manner as in Example 4 to give an organic photosensitive member No. 12.

Evaluation

The photosensitive members Nos. 10 to 12, produced in Example 4 and Comparative Examples 7 and 8, were each set on a reversal development type laser beam printer (trade name: LBP-SX; manufactured by Canon Inc.) to evaluate the images.

The photosensitive member No. 10 caused no faults such as black dots and white dots, and uniform images were obtained even in half-tone images. The photosensitive member No. 11 caused many faults such as black dots and white dots and caused unevenness in half-tone images, and the photosensitive member was found unsuitable for practical use. The photosensitive member No. 12 caused unevenness in half-tone images, where island-like spots were seen, and the photosensitive member was found unsuitable for practical use.

EXAMPLE 5

An aluminum pipe with an outer diameter of 16.2 mm was produced by hot extrusion, and was cut in a length of 248.0 mm. Next, the pipe was cut on its periphery by means of a lathe using a 4R cutting tool at a rotational speed of 10,000 rpm and a feed rate of 0.5 mm/revolution. In order to remove cuttings, air was blown so that the cuttings were forcibly blown off toward the uncut portions. The aluminum pipe having been thus cut had a roundness of 25 μm, a surface roughness of Rmax 5.2 μm and Ra 2.0 μm and an outer diameter of 16.02 mm.

The aluminum pipe was further subjected to rotary pressure rolling using the apparatus as shown in FIG. 3 to give an aluminum pipe having a roundness of 20 μm, a surface roughness Rmax 2.5 μm and Ra 1.0 μm, an outer diameter of 16.00 mm and a length of 248.0 mm. This aluminum pipe was washed with trichloroethane to give a conductive substrate. The rotary pressure rolls used in this Example had the structure as shown in FIGS. 3 and 4, where five rotary pressure rolls 12 were disposed, each having a roll length of 30 mm, a maximum diameter of 5 mm and minimum diameter of 3 mm.

Next, the coating composition composed of the following composition is coated on a surface of the aluminum pipe by spray coating to form a covering layer:

| | |
|---|---|
| Phenol resin (trade name: Plyophen J-325, available from Dainippon Ink & Chemicals, Incorporated) | 20 parts |
| Graphite particle with an average particle diameter of 7 μm | 9 parts |
| Carbon black with an average particle diameter of 0.2 μm | 1 part |
| Isopropyl alcohol | 20 parts |

A surface roughness (Ra) of the covering layer was 3.0 μm.

In this manner, a developing roll No. 1 was produced.

Comparative Example 9

An aluminum pipe on which only the cutting was carried out in the same manner as in Example 5 and no rotary pressure rolling was carried out was prepared. After washing, a covering layer was formed in the same manner as in Example 5 to give a developing roll No. 2.

A surface roughness of the covering layer was 8.0 μm.

Comparative Example 10

An aluminum pipe on which the cutting carried out in Example 5 was not carried out and only rotary pressure rolling was carried out was prepared. The aluminum pipe having been thus rotary-pressure-rolled had a roundness of 60 μm and a surface roughness of Rmax 1.4 μm and Ra 0.5 μm. After washing, a covering layer was formed in the same manner as in Example 5 to give a developing roll No. 3.

A surface roughness of the covering layer was 3.3 μm.

Evaluation

The developing rolls, produced in Example 5 and Comparative Examples 9 and 10, were each set on a reversal development type laser beam printer (trade name: LBP-LX; manufactured by Canon Inc.) to evaluate the images.

The developing roll No. 1 caused no faults such as black dots and white dots, and uniform images were obtained even in half-tone images. The developing roll No. 2 caused many faults such as black dots and white dots, and the developing roll was found unsuitable for practical use. The developing roll No. 3 caused unevenness in half-tone images, where island-like spots were seen, and the developing roll was found unsuitable for practical use.

EXAMPLE 6

An aluminum pipe with an outer diameter of 16.2 mm was produced by hot extrusion, and was cut in a length of 248.0 mm.

Next, the pipe was externally ground by centerless grinding. The centerless grinding apparatus used in this Example had the construction as shown in FIGS. 1 and 2. The grinding wheel had an outer diameter of 610 mm and a length of 405 mm and was rotated at a peripheral speed of 1,800 m/min. The adjusting wheel had an outer diameter of 330 mm and a length of 405 mm and was rotated at a peripheral speed of 500 m/min. The abrasive stone was in a mesh of #400.

The aluminum pipe having been subjected to the centerless grinding had a roundness of 40 μm, a surface roughness of Rmax 4.5 μm and Ra 1.8 μm and an outer diameter of 16.03 mm.

The aluminum pipe was further subjected to rotary pressure rolling using the apparatus as shown in FIG. 3 to give an aluminum pipe having a roundness of 22 μm, a surface roughness Rmax 2.5 μm and Ra 1.0 μm, an outer diameter of 16.02 mm and a length of 248.0 mm. This aluminum pipe was washed with trichloroethane to give a conductive substrate. Thereafter, a covering layer was formed in the same manner as in Example 5. A developing roll No. 4 was thus produced.

Comparative Example 11

An aluminum pipe on which only the centerless grinding was carried out in the same manner as in Example 6 and no rotary pressure rolling was carried out was prepared. After washing, a covering layer was formed in the same manner as in Example 5 to give a developing roll No. 5. A surface roughness of the covering layer was 7.8 μm.

Evaluation

The developing rolls, produced in Example 6 and Comparative Example 11, were each set on a reversal development type laser beam printer (trade name: LBP-LX; manufactured by Canon Inc.) to evaluate the images.

The developing roll No. 4 caused no faults such as black dots and white dots, and uniform images were obtained even in half-tone images. The developing roll No. 5 caused many faults such as black dots and white dots and caused unevenness in half-tone images, and the developing roll was found unsuitable for practical use.

The present invention makes it possible to produce an aluminum pipe with excellent roundness and appropriate surface roughness, to solve problems on a developing roll performance that have not been solved by a roller vanishing, and to provide high quality images.

What is claimed is:

1. A device unit comprising an electrophotographic photosensitive member, and at least one of a charging means, a developing means, and a cleaning means, held in one unit, said unit being detachably provided in the body of an electrophotographic apparatus, wherein said developing means has an aluminum pipe prepared by a process comprising the steps of cutting the aluminum pipe on its periphery, and thereafter carrying out rotary pressure rolling.

2. An electrophotographic apparatus comprising an electrophotographic photosensitive member, a means for forming a latent image, a means for developing the latent image formed and a means for transferring the developed image to a transfer medium, wherein said means for developing has an aluminum pipe prepared by a process comprising the steps of cutting the aluminum pipe on its periphery, and thereafter carrying out rotary pressure rolling.

3. A developing roll comprising an aluminum pipe prepared by a process comprising the steps of cutting the aluminum pipe on its periphery, and thereafter carrying out rotary pressure rolling.

4. The developing roll according to claim 3, further comprising a conductive resin layer on the surface of the aluminum pipe.

5. A developing roll according to claim 3, wherein the cutting is carried out by centerless grinding.

6. A developing roll according to claim 3, wherein three or more rotary pressure rolls are disposed obliquely with respect to the axial direction of the aluminum pipe and are rotated together with a rotary pressure roll holder to work out the aluminum pipe.

* * * * *